Sept. 9, 1958 G. J. MUCHER Re. 24,531

DISCONTINUOUS WIRE-WOUND RESISTANCE AND METHOD OF MAKING

Original Filed Sept. 16, 1954

INVENTOR
George J. Mucher
BY
Kane, Dalsimer & Kane
ATTORNEYS

United States Patent Office

Re. 24,531
Reissued Sept. 9, 1958

24,531

DISCONTINUOUS WIRE-WOUND RESISTANCE AND METHOD OF MAKING

George J. Mucher, Rochester, N. H., assignor to Clarostat Mfg. Co., Inc., Dover, N. H., a corporation of New York Original No. 2,783,343, dated February 26, 1957, Serial No. 456,490, September 16, 1954. Application for reissue February 5, 1958, Serial No. 713,517

10 Claims. (Cl. 201—60)

Matter enclosed in heavy brackets [ ] appears in the original patent but forms no part of this reissue specification; matter printed in italics indicates the additions made by reissue.

This invention relates to improvements in discontinuous wire wound resistances and, particularly to improved means for accurately shorting out one or more selected sections of the windings of such devices and to an improved method of manufacture thereof.

In the manufacture of discontinuous wire wound resistances that are subsequently to be bent in the form of an arc or circle for use in a potentiometer or the like [(]—specifically in those processes employing the well known metal spray, conductive paint or metallic plating shorting techniques—[)], appreciable difficulty is encountered in accurately determining the correct transition point between adjacent sections of constant and variable resistance, and in preventing undue displacement of the wire of the variable resistance sections when the resistance card is bent. Such difficulties are particularly severe in high resistance coils wherein fine wire on the order of .001" to .002" in diameter is [exetremely] *extremely* closely wound. In such cases the size and closeness of the windings renders it impractical to apply known production techniques, such as metal spraying, in the usual manner to short out sections of the wire because the spray cannot conveniently be controlled to the degree of accuracy required. Furthermore, when the resistance card is subsequently bent, the rigid plate formed by the sprayed, painted or plated bond of a constant resistance section inevitably causes a crowding of the wires of the adjacent variable resistance section which may result in an undesirable pile-up of wires and may even result in a breakdown of the insulation on the wires with consequent shorting out of one or more turns of the variable resistance section. In extreme cases, several turns of the winding may actually override one another, thereby changing the electrical value which is to be imparted.

A general solution to this type of problem is known wherein the resistance wire is wound on a card and a plurality of adjacent turns are bonded together by a metal spray to form a shorted out section slightly less than the length of the desired constant resistance section. The wire is then cut at the junction of the constant and variable resistance sections, and the first turn of the variable resistance section is soldered to the bonded wires; whereby the transition point between the constant and variable resistance sections is defined with a high degree of accuracy.

Although the described arrangement is highly advantageous in most applications and is readily adaptable to high production techniques, it is not entirely suitable to all applications because the soldering of individual turns is quite costly. Therefore, such a process is usually reserved for special applications in which an extremely high degree of precision is required. As a solution to this problem that is readily adapted to high production techniques, applicant has found an improved method of application of the metal spray to the section to be shorted out, which can readily be adjusted to provide the required high degree of accuracy in determining the transition point between the constant and variable resistance sections and, at the same time, is effective to eliminate the crowding of the wires of the adjacent variable resistance section.

Briefly, in one form of this invention, applicant has found that the combination of two substantially parallel strips of sprayed metal, extending to a point just short of the end of the desired constant resistance section, and a separate dot or island of sprayed metal that is arranged either above or below the level of such strips and overlaps the junction of the constant and variable resistance sections, provides an effective shorting bond that eliminates the crowding of the wires of the adjacent variable resistance section. Furthermore, in such an arrangement, the spray metal dot or island can conveniently be trimmed after application to the exact junction of the constant and variable resistance sections to provide an extremely accurate manufacturing control. In a modification of the invention, applicant has found that a hook-shaped strip of sprayed metal, or any other configuration thereof that permits relative movement of the wires within the shorted-out section, is also highly effecive to absorb the pile-up of the resistance wire.

Thus, the principal object of the invention is to provide a discontinuous wire wound resistance card, having extremely closely wound turns, wherein the wire of the constant resistance section is effectively bonded to eliminate crowding of adjacent variable resistance sections, and the junction of the constant and variable resistance sections is determined to a high degree of accuracy, and to provide an improved method of manufacturing such a resistance card.

A further object is to provide a discontinuous wire wound resistance card in which one or more selected portions of the windings may be conveniently and accurately shorted out.

A still further object is to provide a resistance card to produce a discontinuous resistance output having stable variable resistance characteristics.

Another object of the invention is to provide an improved construction for a discontinuous wire wound resistance card whereby a compact and economical product can readily be produced by conventional high production techniques.

*Another object of this invention is to provide a discontinuous resistance card which is bowed or bent into cylindrical shape and has non-crowding metal spray patterns for shorting out certain resistance wire turns to form sections of no resistance or constant resistance.*

Preferred forms of the invention are shown in the drawings, in which.

Figure 1:
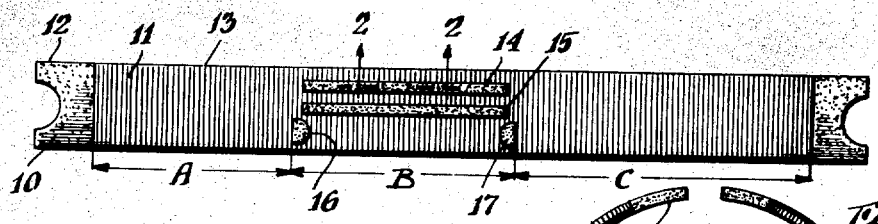
Fig. 1 is a side elevation of a wire wound resistance card having a center section of resistance shorted out in accordance with the invention.
Figure 3:
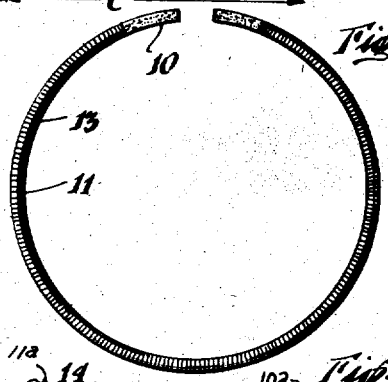
Fig. 3 is a plan view of a resistance card formed for assembly in a potentiometer.

Referring to Fig. 1 there is shown a conventional type of potentiometer resistance card assembly that comprises a resistance card 10 on which a continuous resistance wire 11 is wound. Card 10 is usually made of a flat strip of thermosetting material which may conveniently be inserted in a winding machine for the purpose of applying the resistance wire, and is provided with at least one straight edge 12 whereby the wire wound thereon forms a smooth and continuous contact edge 13. *In Fig. 5 one surface of card 10 is designated generally by the numeral 10a and can be referred to as the internal surface of the card and the other surface of the card 10 is designated generally by the numeral 10b and can be referred to as the external surface of the card. Also the surface of wire 11 which is formed by the outer surface of that portion of the resistance wire which lies adjacent the internal surface of the card is designated generally by the numeral 11a and can be referred to as the second internal surface while the surface of wire 11 which is formed by the outer surface of that portion of the resistance wire which lies adjacent the external surface of the card is designated generally by the numeral 11b and can be referred to as the second external surface.* Subsequently the assembled coil is heated in a suitable manner and bent into a circular form, as shown in Fig. 3, for assembly in a potentiometer frame wherein contact edge 13 is traversed by a contact wiper fixed on a suitable shaft of the potentiometer.

In general, a resistance card of this type is designed to provide increasing resistance as the wiper of the associated potentiometer is moved over contact edge 13 as, for example, from left to right in Fig. 1. However, in many instances it is required that a constant resistance output be provided that corresponds to a predetermined degree of rotation of the potentiometer shaft. Although a variety of methods have been proposed to effect this result, in accordance with the present invention it is accomplished by shorting out a plurality of adjacent turns of wire 11 to form a shorted out section having a resistance equal to that of the last turn of the adjoining variable resistance section.

The manner of forming such a shorted out section can best be shown by a specific application, as illustrated in Fig. 1, wherein it is assumed that the potentiometer is to produce variable resistance outputs during the period that its wiper contact traverses the sections A and C of the resistance card, and is to produce a constant resistance output, corresponding to the resistance of the last turn of section A, while the wiper contact is traversing section B. To prepare such a shorted out section, all the turns in section B and a small portion of the adjoining ends of sections A and C are thoroughly cleaned to expose the bare wire. The resistance card is then suitably masked and a metal spray is applied in such manner that two parallel strips 14 and 15 and two auxiliary dots or islands 16 and 17 are formed on the surface of the wire. The dots or islands 16 and 17 may be of any desired configuration but are preferably round since this form is usually the easiest to make.

Figure 2:
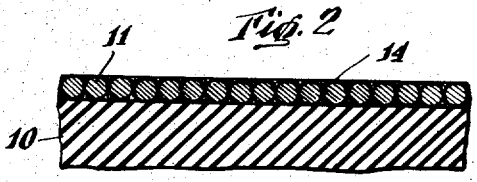
Fig. 2 is a sectional view taken along the line 2—2 of Fig. 1.

The masking operation is so performed that strips 14 and 15 are positioned within the limits of the constant resistance section, and islands 16 and 17, respectively, overlap the junctions of the constant resistance section with each of the adjoining variable resistance sections. The spray metal employed may be of any suitable type, such as zinc, that forms a good electrical bond with each of the individual turns of resistance wire 11 [(]—as in Fig. 2—[)] and at the same time forms a continuous conductive path over the entire area of strips 14, 15 and islands 16, 17 . Thus, the resistance of a section of wire, slightly in excess of the proposed constant resistance section B, is effectively shorted out. Thereafter, an operator with the aid of a microscope and precision instruments determines the exact location of the ends of the constant resistance section and removes the shorting material, by scraping or abrading, from each of islands 16 and 17 that overlap the adjoining variable resistance sections.

By this arrangement it is apparent that a constant resistance section can be defined with a high degree of accuracy in a maner that can be accomplished with conventional high production metal spray techniques. The only requirement being that the spray mask must be applied with sufficient accuracy that one or more turns of wire of the proposed constant resistance section at each end of strips 14 and 15 remain exposed, and that islands 16 and 17 overlap at least one turn of the adjoining variable resistance section. Thus, islands 16 and 17 are effectively vernier adjustments to permit the constant resistance sections to be limited precisely to their required dimensions.

Figure 4:
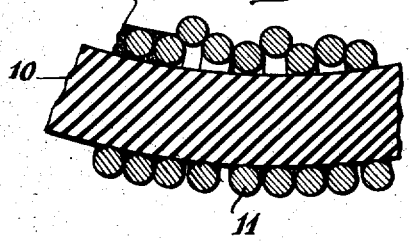
Fig. 4 is a sectional view of a portion of a resistance card, formed for assembly in a potentiometer, illustrating the piling-up of turns that occurs between sections of conventionally bonded wire.
Figure 5:
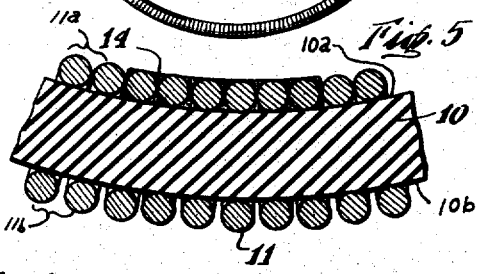
Fig. 5 is a sectional view, similar to Fig. 4, in which the wire is bonded in accordance with the invention.

In addition to their shorting function, strips 14, 15 and islands 16, 17 also serve to minimize crowding of adjacent unbonded wires, especially in the case of extremely closely wound coils. In such instances, it is found that if a conventional spraying, painting, or plating technique is employed, the adjacent wires tend to pile up next to bonded sections, in the manner indicated in Fig. 4, when card 10 is formed for assembly in a potentiometer frame. However, by the use of parallel strips, in which the upper strip 14 is located relatively close to contact edge 13, it is found that any piling up of wire that occurs is localized between the strips or below strip 15 *and within the extremities of islands 16 and 17,* whereas the portions of the turns covered by strips 14 and 15 remain in contact with the card, as illustrated in Fig. 5, and there is no undue crowding of adjacent wires. This [results] *result* is achieved because of the fact that the parallel strips do not form an unyielding solid plate, as in conventional [practical] *practice,* but permit a certain degree of compression without cumulative crowding or pile-up at the ends.

It may be noticed that a single strip 14 may be all that is required to obtain the above results in many instances. However, the second strip 15 is employed to insure continuous shorting. Preferably strip 14 is placed close to contact edge 13 to minimize the effect of intermittent resistance. However, islands 16, 17 may be placed closest to the contact edge, should the nature of a particular problem so require, to obtain more critical control at the hop-off points.

Figure 6:
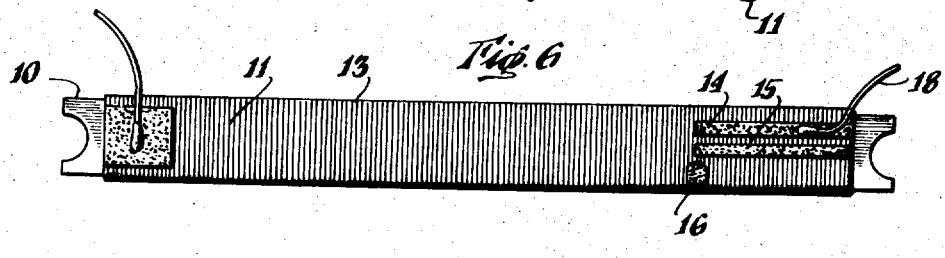
Fig. 6 is a side elevation of a wire wound resistance card having an end section shorted out in accordance with the invention.

The method described above is equally adaptable to short out a resistance section at the end of the card, as indicated in Fig. 6. In this case, obviously, only a single island 16 need be employed with each pair of strips 14 and 15. Also, inasmuch as strips 14 and 15 are relatively rigid, they may conveniently be employed as connecting point areas to which a lead or tap 18 may be soldered to connect the resistance card with its associated circuit.

Figure 7:
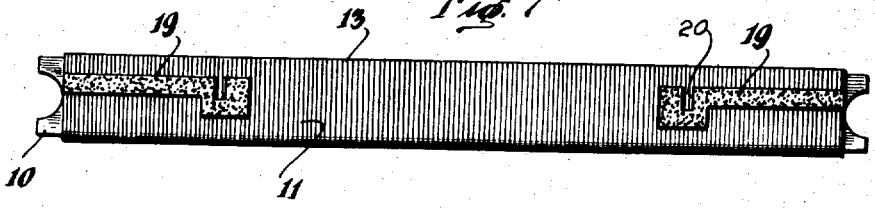
Fig. 7 is a side elevation of a wire wound resistance card having two end sections shorted out in accordance with a modification of the invention.

As a modification of the invention, it is also found that spray metal shorting strips are advantageous to lessen piling up of the wire within a shorted area when formed in the shape of a hook or loop 19, as shown in Fig. 7. In this arrangement, when the resistance card is curved and crowding occurs, no difficulty is experienced because the loops which tend to override each other shift into the slot of the hook or pile up along its shank in the middle of the card. However, it is found that no overriding occurs in the variable resistance section of the card *since the over-crowded winding will not go beyond the extremities of the shorting material. As can be seen in Fig. 7, the hook 19 defines a slot 20 which may be described as a recess in a longitudinal edge of the metal strip forming the constant resistance section, said recess providing in said constant resistance section an uncovered portion of the internal surface of the wire windings extending laterally into the strip to allow bunching of the wire within the recess.* If desired, hook 19 may be used in combination with an island 16, as described in connection with Figs. 1 and 6, to obtain a high degree of accuracy in defining such a shorted out section.

Obviously, other patterns of spray or paint bonding may be employed to produce a similar effect. For example, the bonding material may be applied as a series of overlapping dots, or in a woven or zig-zag pattern, as long as there is sufficient room to permit some overriding of the bonded wires at points intermediate the ends of the bonded section.

As thus far described, the invention as shown is applied to a linear resistance. However, since [its] *it* is well known that potentiometers are frequently employed to [represents] *represent* non-linear [fucntions] *functions* simply by varying the gauge and/or spacing of the resistance wire or by varying the shape of the card on which the wire is wound, it is apparent that the present invention may also be applied to non-linear equipment.

Thus, among others, the several objects of the invention as specifically noted above are achieved. Obviously, numerous changes in construction and rearrangement of the parts may be made without departing from the scope of the invention as defined by the claims.

I claim:

1. The method of manufacturing a discontinuous resistance card including a section of constant resistance and a section of variable resistance comprising the steps of forming a resistance card of a length to accommodate such sections, winding said card with a resistance wire over the entire length occupied by both said resistance sections, forming an electrical bond between adjacent turns of the constant resistance section over the portion extending from the first turn of said section to a point at least one turn short of its junction with the variable resistance section, forming a vernier electrical bond between adjacent turns of wire at the junction of said sections, said vernier bond including a plurality of turns of the constant resistance section and at least one turn of the adjacent variable resistance section to extend the bonded section of wire slightly in excess of the constant resistance section, determining the exact junction of the two sections, and removing the vernier electrical bond from all turns of the variable resistance section [except the first turn thereof].

2. The method of manufacturing a discontinuous resistance including a section of constant resistance arranged between two sections of variable resistance comprising the steps of forming a resistance card of a length to accommodate such sections, winding said card with a resistance wire over the entire length occupied by said resistance sections, forming an electrical bond between adjacent turns of the constant resistance section over the portion extending between points at least one turn short of each of its junctions with the variable resistance sections, forming vernier electrical bonds between adjacent turns of wire at each end of said constant resistance section, each of said vernier bonds including a plurality of turns of the constant resistance section and at least one turn of the adjacent variable resistance section to extend the bonded section of wire slightly in excess of the constant resistance section, determining the exact junction of the constant resistance section with each of the variable resistance sections, and removing the vernier electrical bond from all turns of the variable resistance sections [except the first turn of each of said sections].

3. The method of manufacturing a discontinuous resistance card including a section of constant resistance and a section of variable resistance comprising the steps of forming a resistance card of a length to accommodate such sections, winding said card with a resistance wire over the entire length occupied by both said resistance sections, forming an electrical bond between adjacent turns of the constant resistance section over the portion extending from the first turn of said section to a point at least one turn short of its junction with the variable resistance section, said electrical bond comprising a pair of spaced metallic strips substantially parallel to one another and perpendicular to the individual turns of said resistance wire, forming a second electrical bond between adjacent turns of wire at the junction of said sections, said vernier bond comprising a metallic island in contact with a plurality of turns of the constant resistance section and at least one turn of the variable resistance section, determining the exact junction of the two sections to extend the bonded section of wire slightly in excess of the constant resistance section, and removing the electrical bond from all turns of the variable resistance section [except the first turn thereof].

4. A discontinuous resistance card including a section of constant resistance and a section of variable resistance comprising a resistance card of a length to accommodate such sections, a resistance wire wound over the entire length occupied by both said resistance sections, an electrical bond connecting adjacent turns of the constant resistance section over the portion extending from the first turn of said section to a point at least one turn short of its junction with the variable resistance section, and a vernier electrical bond [connecting adjacent turns of wire at the junction of said sections], said vernier bond connecting a plurality of turns of the constant resistance section [and at least the first turn of the variable resistance section to extend the bonded section of wire slightly in excess of the constant resistance section], *up to and including the first turn of the constant resistance section adjacent the variable resistance section.*

5. A discontinuous resistance card including a section of constant resistance arranged between two sections of a variable resistance comprising a resistance card of a length to accommodate such sections, a resistance wire wound over the entire length occupied by said resistance sections, an electrical bond connecting adjacent turns of the constant resistance section over the portion extending between points at least one turn short of each of its junctions with the variable resistance sections, and vernier electrical bonds [connecting adjacent turns of wire at each end of said constant resistance section], each of said vernier bonds connecting respectively a plurality of turns of the constant resistance section [and at least the first] *up to and including the first turn of the constant resistance section adjacent the variable resistance section* [turn of the adjacent variable resistance section to extend the bonded section of wire slightly in excess of the constant resistance section].

6. A discontinuous resistance card including a section of constant resistance and a section of variable resistance comprising a resistance card of a length to accommodate such sections, a resistance wire wound over the entire length occupied by both said resistance section, an electrical bond connecting adjacent turns of the constant resistance section over the portion extending from the first turn of said section to a point at least one turn short of its junction with the variable resistance section, said electrical bond comprising a plurality of metallic strips substantialy parallel to one another and perpendicular to the individual turns of said resistance wire, and a vernier electrical bond [connecting adjacent turns of wire at the junction of said sections], said vernier bond comprising a metallic island in contact with a plurality of turns of the constant resistance section connected by said first mentioned bond [and with at least the first turn of the variable] *up to and including the first turn of the constant resistance section adjacent the variable resistance section* [resistance section to extend the bonded section of the wire slightly in excess of the constant resistance section].

7. The method of manufacturing a discontinuous resistance card including a section of constant resistance and a section of variable resistance comprising the steps of forming a resistance card of a length to accommodate such sections, winding said card with a reistance wire over the entire length occupied by both said resistance sections, forming an electrical bond between adjacent turns of the constant resistance section over the portion extending from the first turn of said section to a point at least one turn short of its junction with the variable resistance section, forming a vernier electrical bond between adjacent turns of wire at the junction of said sections, said vernier bond including a plurality of turns of the constant resistance section and at least one turn of the adjacent variable resistance section to extend the bonded section of wire slightly in excess of the constant resistance section, determining the exact junction of the two sections, and removing the electrical bond from all windings of said wire except where such bond is touching a constant resistance winding.

*8. A discontinuous resistance including in combination a resistance card bent into bowed form, an internal surface of said card, an external surface of said card, a continuous resistance wire wound on said card, a second internal surface formed by the outer surface of that portion of the resistance wire which lies adjacent the internal surface of said card, a second external surface formed by the outer surface of that portion of the resistance wire which lies adjacent the external surface of said card, a strip of electrical shorting material covering a longitudinal area of the second internal surface and shorting adjacent turns of said wire, said electrical shorting material covering only an intermediate fraction of the second internal surface of each shorted strand to form a constant resistance section defined by the extremities of said shorting material, said strip being shaped to form a recess in a longitudinal edge thereof to provide in said constant resistance section an uncovered portion of said second internal surface extending laterally into said strip to allow bunching of said wire within said recess.*

*9. A discontinuous resistance including in combination a resistance card bent into bowed form, an internal surface of said card, an external surface of said card, a continuous resistance wire wound on said card, a second internal surface formed by the outer surface of that portion of the resistance wire which lies adjacent the internal surface of said card, a second external surface formed by the outer surface of that portion of the resistance wire which lies adjacent the external surface of said card, a metallic strip of electrical shorting material disposed upon the second internal surface and shorting adjacent turns of said wire, said electrical shorting material covering only a fraction of each shorted strand, a metallic dot separated from said strip and overlapping an end thereof to form a partially parallel island on the second internal surface, said strip and said island together defining a constant resistance section with uncovered portions of the second internal surface within the constant resistance section between said end of said strip and said island so that said wire can bunch within said uncovered portions.*

*10. A discontinuous resistance including in combination a reistance card bent into bowed form, an internal surface of said card, an external surface of said card, a continuous resistance wire wound on said card, a second internal surface formed by the outer surface of that portion of the resistance wire which lies adjacent the internal surface of said card, a second external surface formed by the outer surface of that portion of the resistance wire which lies adjacent the external surface of said card, an electrical shorting material covering an area of the second internal surface and shorting adjacent turns of said wire to form a constant resistance section, said electrical shorting material covering only a fraction of each shorted strand, a variable resistance section formed by the unshorted turns of said wire, said shorting material comprising a metallic strip substantially perpendicular to the individual turns of said resistance wire and a portion of said shorting material forming a hook configuration at the end of said constant resistance section contiguous to the variable resistance section so that said wire can bunch within the slot of the hook so formed.*

References Cited in the file of this patent or the original patent

UNITED STATES PATENTS

| | | |
|---|---|---|
| 2,005,456 | Creager | June 18, 1935 |
| 2,023,603 | Lodge | Dec. 10, 1935 |
| 2,438,250 | Moore | Mar. 23, 1948 |